United States Patent [19]

Streffing et al.

[11] Patent Number: 5,687,658
[45] Date of Patent: Nov. 18, 1997

[54] METHOD OF INCREASING THE LEVEL OF VOLATILES IN A PULVERIZED COAL MIXTURE

[75] Inventors: Michael Streffing, Marl; Alfons Leisse, Essen, both of Germany

[73] Assignee: Babcock Lentjes Kraftwerstechnik GmbH, Oberhausen, Germany

[21] Appl. No.: 662,058

[22] Filed: Jun. 12, 1996

[30] Foreign Application Priority Data

Jun. 13, 1995 [DE] Germany ............ 195 21 505.2

[51] Int. Cl.⁶ ................................ F23D 1/00
[52] U.S. Cl. ............ 110/347; 110/265; 110/229; 110/232; 122/4 D; 122/40
[58] Field of Search ............... 110/347, 263, 110/264, 265, 229, 232, 101 R, 101 CF; 122/40

[56] References Cited

U.S. PATENT DOCUMENTS 4,419,941  12/1983  Santalla .................. 110/232
4,627,366  12/1986  LaRue et al. ............ 110/263

*Primary Examiner*—Henry A. Bennett
*Assistant Examiner*—Pamela A. O'Connor
*Attorney, Agent, or Firm*—Max Fogiel

[57] ABSTRACT

A method of burning coal with less than 10% volatiles in a burner supported by air. The coal is pulverized in a pulverizer and supplied to the burner mixed with a vehicle in the form of air. The object is more reliable ignition. The coal is separated from the air before it enters the burner and is combined into a new mixture with heated air. The second mixture is forwarded at a higher temperature and with a lower level of coal. The coal is separated from the second mixture and combined into a third mixture with heated air. The third mixture is forwarded at a higher temperature and with a higher level of coal.

6 Claims, 4 Drawing Sheets

METHOD OF INCREASING THE LEVEL OF VOLATILES IN A PULVERIZED COAL MIXTURE

BACKGROUND OF THE INVENTION

The present invention concerns a method of burning coal with less than 10% volatiles in a burner supported by air.

Pulverized coal can be suspended in gas in the known method and supplied to the burner directly from the pulverizer, semi-directly subsequent to separation, or indirectly from a bin.

A combination of fuel and air can be ignited at a prescribed point only subject to two conditions. First, the current must be slower at that point than the mixture's re-ignition speed. Second, the mixture's air count n, which is a function of its pressure and temperature, must be between a minimum and a maximum: $n_{min} < n < n_{max}$.

The energy needed for stable ignition and heating of the combustion, or primary, gas can be obtained when coal is burned in the vicinity of the burner only by burning the volatiles already released. If all the volatiles can be released and burned at the exit from the burner, an adiabatic increase in temperature of 1000 K can be calculated, even for an anthracite with 5% volatiles (dry and free of ash). The resulting temperature in the core flame will be high enough to heat and burn the residual coke as well. If on the other hand the temperature of the combination of primary gas and air is too low to gasify a significant percentage of the volatiles in the coal, the flame will be extinguished due to a shortage of fuel. The local air count will be too high and the mixture too thin. These conditions can be expected when coal with less than 10% volatiles is burned in a pulverized-coal burner without special measures being taken.

SUMMARY OF THE INVENTION

The object of the present invention is a method of reliably igniting and burning coal with less than 10% volatiles in a pulverized-coal burner.

The separation of pulverized coal and its combination with heated air increases the level of coal in the mixture. The absolute level of volatiles in the mixture is accordingly increased. Enough volatiles will accordingly be available to gasify at the mixture's higher temperature. The heat of combustion released by the burning of these gasified volatiles will lead in a sort of chain reaction to the ignition temperature of the residual coke. In semi-direct firing the coal is intermediately separated twice, and once in indirect firing. The temperature and coal level of the mixture can be varied widely and almost independently by separating the coal and mixing it with the heated air.

BRIEF DESCRIPTION OF THE DRAWINGS

Several embodiments of the present invention will now be specified with reference to the accompanying drawing, wherein.

DESCRIPTION OF THE PREFERRED EMBODIMENTS

Figure 1:
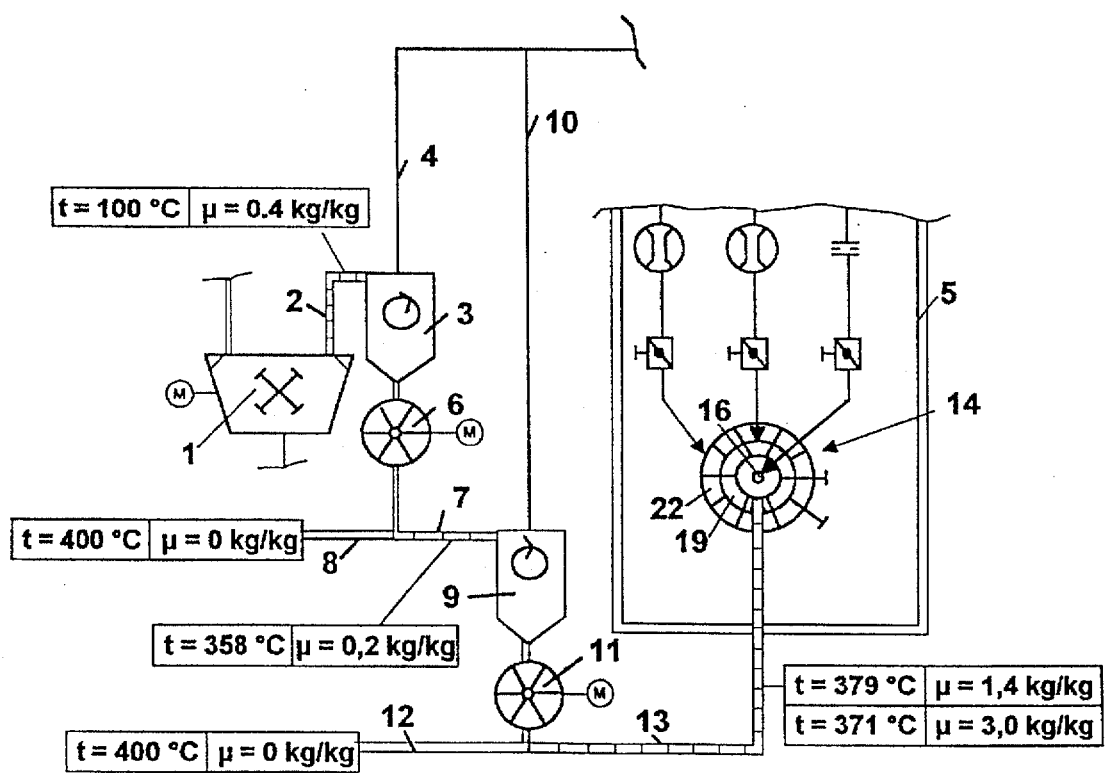
FIG. 1 is a diagram illustrating the semi-direct injection of pulverized coal into a burner.

Coal containing less than 10% volatiles, anthracite accordingly, is ground in a pulverizer 1. A vehicle in the form of heated air removes the pulverized coal through a line 2. Due to the conditions prevailing in pulverizer 1, the level μ of coal in the mixture leaving it is less than 0.5 kg per kg of vehicle. The temperature is approximately 100° C. To ensure ignition and combustion of such a mixture in the burner the coal is treated as will now be specified.

The mixture is supplied to a precipitator 3 in the form of a cyclone, wherein the coal is separated from the vehicle. The vehicle is then forwarded in the form of a vapor to the firing chamber 5 of a boiler through a vapors line 4. The coal arrives in a coal-conveyor line 7 by way of a disaggregator 6 in the form of a paddlewheel for example. Heated air is injected into coal-conveyor line 7 from a heated-air injection line 8. The temperature of the air is preferably approximately 400° C. It is practical to obtain the air from the boiler's air heater. The air both acts as a vehicle for the coal and heats the mixture. Enough air is employed in accordance with the volume of coal to heat the mixture to 358° C. and adjust the level μ of coal to less than 1.0 kg/kg. The mixture is forwarded to another cyclone-type precipitator 9, wherein the coal is again separated from the vehicle. The vapors are conveyed to the boiler's firing chamber 5 through another vapors line 10. The separated coal is combined in another paddlewheel-type disaggregator 11 with air heated to approximately 400° C. and obtained from a line 12. The new mixture is conveyed to a coal burner 14 over another coal-conveying line 13. Several coal burners 14 are accommodated in the wall of firing chamber 5. Depending on how much air is supplied, the temperature of the mixture in second coal-conveying line 13 will, immediately before entering the burner, be 379° C. for a level μ=1.4 kg/kg and 371° C. for a level μ=3.0 kg/kg.

Figure 2:
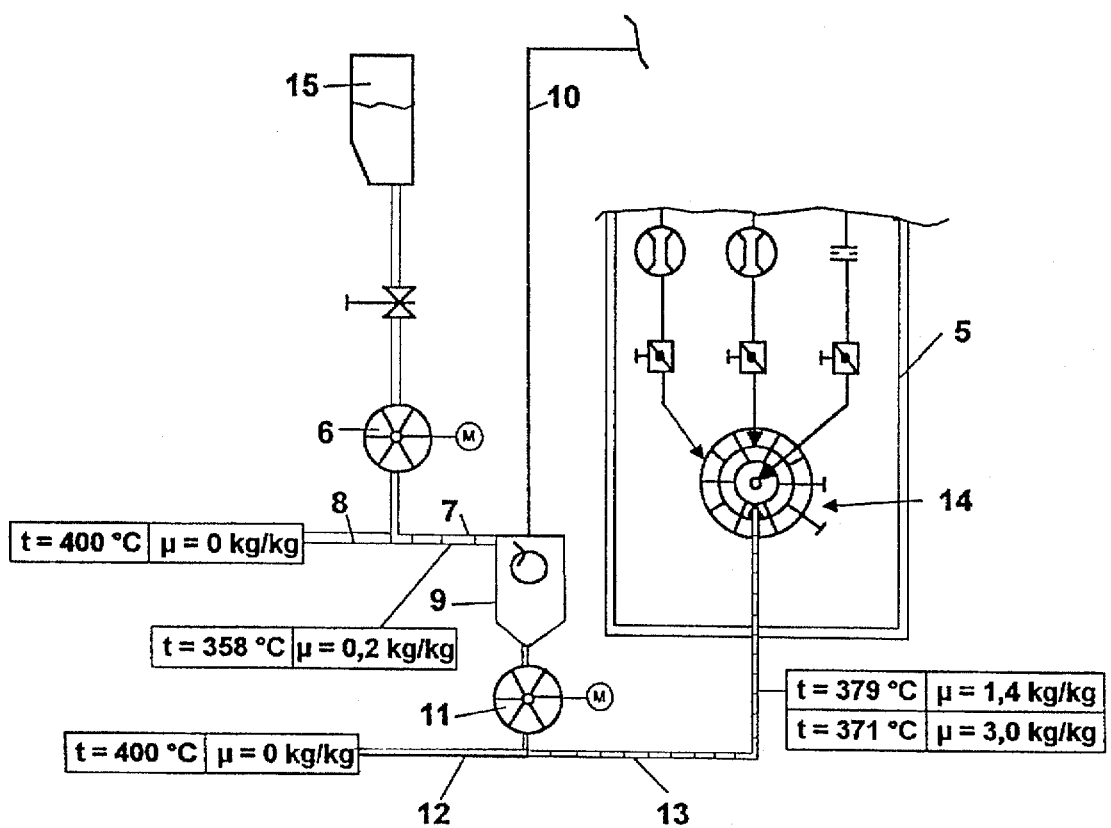
FIG. 2 is a diagram illustrating the indirect injection of pulverized coal into a burner.

Instead of semi-direct, which involves separating the coal twice, the firing can also be indirect, as illustrated in FIG. 2. In this approach, the coal is ground in a pulverizer and stored temporarily in a bin 15. Bin 15 serves the same purpose as the first coal precipitator 3 in the semi-direct system illustrate in FIG. 1. The coal needs to be separated only once in the present system. The separation occurs in precipitator 9, after the coal has been extracted from bin 15 by way of second paddlewheel-type disaggregator 11 and combined in second coal-conveying line 13 with heated air obtained from line 12.

Figure 3:
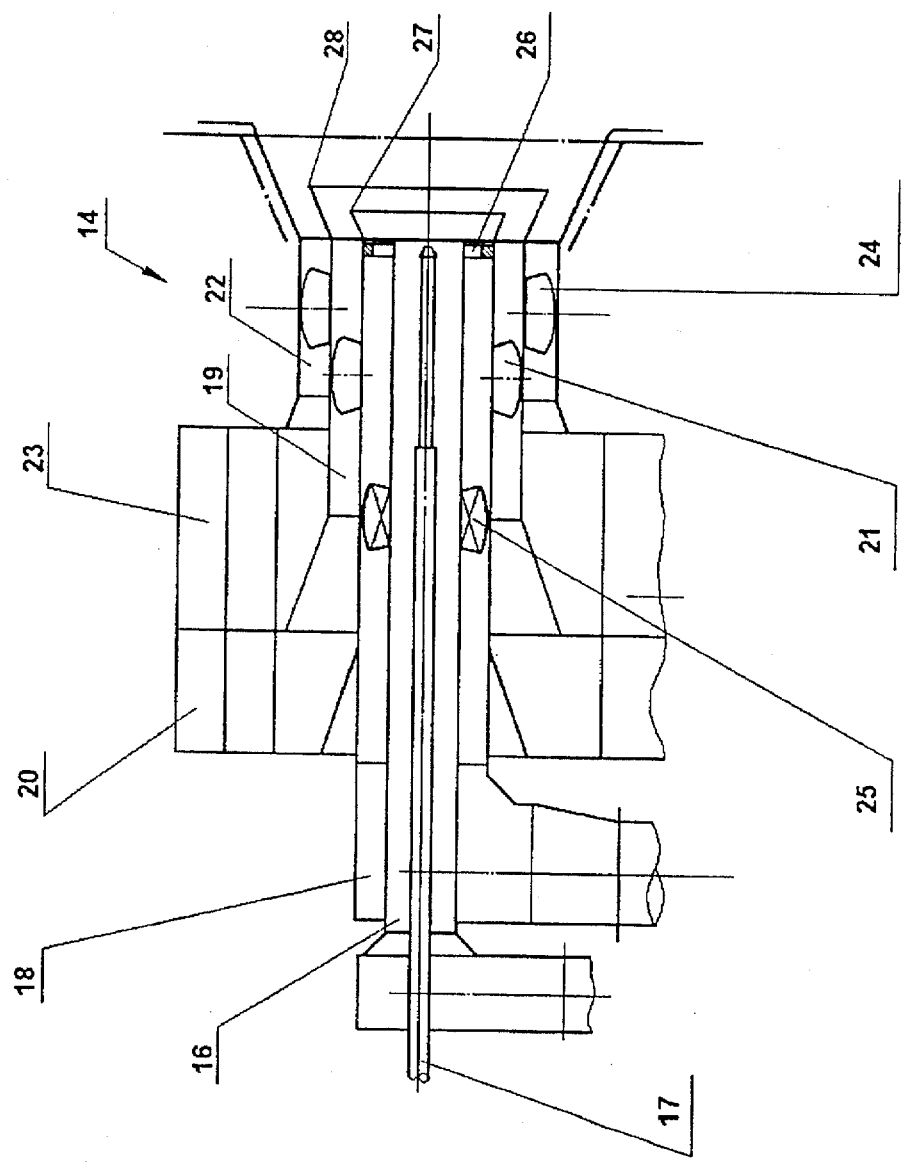
FIG. 3 is a longitudinal section through a burner.

FIG. 3 is a detail of the coal burner 14 actually employed in the method just specified. It features a lee in the vicinity of the ignition that decelerates the combination of coal and vehicle to below the speed of re-ignition. A burner of this type is described in German Patent 4 217 879. It is distinguished by the concentricity of its flow cross-section.

Specifically, coal burner 14 features a central core-air tube 16. Core-air tube 16 accommodates an oil-burner lance 17 and is itself accommodated in a coal-conveying tube 18. The intake into coal-conveying tube 18 communicates with coal-conveying line 13. Coaxially accommodating coal-conveying tube 18 is a secondary-air supply tube 19. Tube 19 communicates with a spiraling intake housing 20. Accommodated inside secondary-air supply tube 19 are adjustable valves 21 that apply a stable spin to the axial flow of secondary air. Coaxially accommodating secondary-air supply tube 19 is a tertiary-air supply tube 22. Tertiary-air supply tube 22 communicates with a spiraling intake housing 23. Accommodated inside tertiary-air supply tube 22 are further adjustable valves 21 that apply a stable spin to the axial flow of tertiary air. The combustion air is separated by core-air tube 16, secondary-air supply tube 19, and tertiary-air supply tube 22 into three subsidiary currents.

A turbulence generator 25 is accommodated inside coal-conveying tube 18 at a specific distance upstream of where it opens into central core-air tube 16. Turbulence generator 25 applies a rotation to the flow of the mixture, evening out the flow inside coal-conveying tube 18 while increasing the level of coal at the tube's periphery. Positioned at the exit from coal-conveying tube 18 is a stabilization ring 26. The circumference of stabilization ring 26 is divided into separated segments. The segments extend into coal-conveying tube 18 from the outside circumference of stabilization ring 26, uniformly shredding the flow of coal, diverting it inward, and accordingly creating an ignition-promoting zone of recirculation in the lee afforded by stabilization ring 26.

Coal-conveying tube 18 is extended at its exit, creating a secondary-air repelling bell 27. Tertiary-air supply tube 22 terminates in tertiary-air repelling bell 28. Spiraling secondary-air intake housing 20, spiraling tertiary-air intake housing 23, secondary-air repelling bell 27, and tertiary-air repelling bell 28 apply a stable twist to the combustion air around the inner core of the flame. To restrict turbulence to the interfaces and accordingly keep premature combustion of the separate currents low, they rotate in the same direction.

Figure 4:
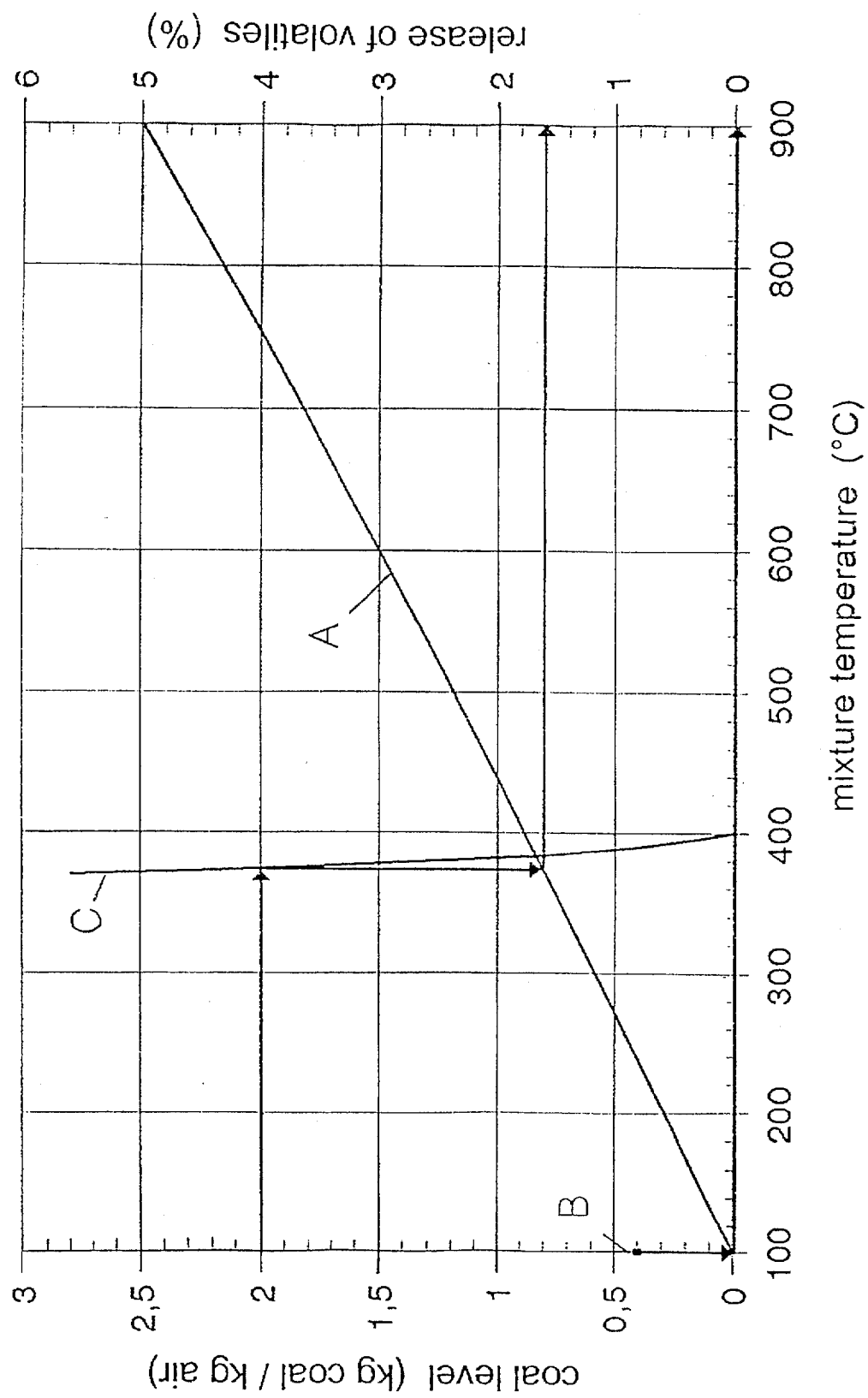
FIG. 4 is a graph.

The effects of the method in accordance with the present invention are illustrated in FIG. 4, which is a graph of the relation between coal level (left Y axis in kg of coal per kg of air), mixture temperature (X axis in °C.) and free volatiles (right Y axis in percent), employing as an example an anthracite that contains 5% volatiles. Curve A represents in association with the right Y axis the release of volatiles as a function of mixture temperature. It will be evident that the percentage of volatiles released from the coal increases with temperature. At a mixture temperature of 100° C. at the exit from the pulverizer and at a coal level µ of 0.4 kg/kg (point B), no volatiles are released. No combustion gas would accordingly be available at the exit from the burner in direct firing at the state of the art, and it would not be possible to ignite a flame at that point. In semi-direct firing accompanied by separating the coal twice, and at a mixture temperature of 360° to 400° C., in accordance with the present invention on the other hand, a significant percentage of volatiles will already have been released at the burner exit and will ignite. As will also be evident from FIG. 4, 1.6% of the volatiles in a mixture with a coal level µ of 2.0 kg/kg will have gasified at a temperature of 370° C. The initial ignition will elevate the temperature even higher, and more volatiles will gasify and burn as represented by Curve A. The same result can be obtained with indirect firing and a single separation.

We claim:

1. A method for burning coal with less than 10% volatiles in a burner supported by air, comprising the steps of: pulverizing coal in a pulverizer and supplying the pulverized coal to said burner and mixing with a vehicle in form of air in a first mixture; separating the coal from the air before the coal enters the burner and is combined into a second mixture with heated air; forwarding said second mixture at a higher temperature and with a lower level of coal; separating the coal from said second mixture and combining into a third mixture with heated air; and forwarding said third mixture at a higher temperature and with a higher level of coal.

2. A method as defined in claim 1, wherein coal leaving the pulverizer is forwarded semi-directly to said burner and initially separated in a precipitator downstream of said pulverizer.

3. A method as defined in claim 1, wherein coal leaving the pulverizer is forwarded indirectly to said burner and initially separated in a bin upstream of where the second separation occurs.

4. A method as defined in claim 1, wherein the heated air provided to the second mixture is heated to approximately 400° C.

5. A method as defined in claim 1, wherein the level of coal resulting from its combination with an appropriate volume of heated air is maintained at less than 0.5 kg per kg of air subsequent to the first separation and at less than 1.0 kg per kg of air subsequent to the second separation.

6. A method as defined in claim 1, wherein the second mixture of coal and vehicle is heated to 360° C. to 400° C.

* * * * *